US007486971B2

(12) United States Patent
Awada et al.

(10) Patent No.: US 7,486,971 B2
(45) Date of Patent: Feb. 3, 2009

(54) METHOD AND APPARATUS FOR MANAGING RING TONES IN A MOBILE DEVICE

(75) Inventors: Faisal M. Awada, Round Rock, TX (US); Joe Nathan Brown, Austin, TX (US); Philip Bernard Burkes, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 11/002,539

(22) Filed: Dec. 2, 2004

(65) Prior Publication Data

US 2006/0121949 A1 Jun. 8, 2006

(51) Int. Cl.
*H04B 1/38* (2006.01)
*H04B 7/00* (2006.01)
*H04L 12/58* (2006.01)

(52) U.S. Cl. .................. 455/567; 455/412.1; 455/41.1
(58) Field of Classification Search ................. 455/567, 455/568, 436, 450, 3.06, 422.1, 550.1; 379/373.01, 379/374, 372, 373
See application file for complete search history.

(56) References Cited

U.S. PATENT DOCUMENTS

| 6,094,587 | A  | * | 7/2000  | Armanto et al. ............. 455/567 |
| 6,591,103 | B1 |   | 7/2003  | Dunn et al. .................. 455/436 |
| 6,636,808 | B1 |   | 10/2003 | Brown et al. ..................... 702/3 |
| 7,103,391 | B2 | * | 9/2006  | Chan .......................... 455/567 |
| 7,233,658 | B2 | * | 6/2007  | Koser et al. ............ 379/373.01 |
| 7,248,900 | B2 | * | 7/2007  | Deeds ........................ 455/567 |
| 2002/0115456 | A1 | * | 8/2002 | Narinen et al. .............. 455/466 |
| 2003/0069002 | A1 | * | 4/2003 | Hunter et al. ............... 455/404 |
| 2004/0180700 | A1 | * | 9/2004 | Hubbe et al. ................ 455/567 |
| 2004/0203353 | A1 | * | 10/2004 | Connor ..................... 455/41.1 |
| 2006/0128439 | A1 | * | 6/2006 | Lee ............................ 455/567 |

OTHER PUBLICATIONS

IBM Research Disclosure 416131, "Non-Intrusive System to Warn the Disabled of Dangerous Situations", Dec. 1998, pp. 1705.
http://www.red-m.com/news/news_alert6.asp, New Red-Alert Pro from Red-M is First Standalone WLAN IDS to Detect Bluetooth and 802.11 a/b/g, Oct. 20, 2004, pp. 1-2.
IBM Technical Disclosure Bulletin, "Providing Services in Node Network Modal", Dec. 1995, pp. 263-266.
IBM Technical Disclosure Bulletin, "Improved Compare and Swap Instruction using Change Bits for Computer Systems with Broadcast", Mar. 1992, pp. 117-119.
U.S. Appl. No. 09/735,341, Bonalumi et al., Radio Receiver that Changes Function According to the Output of an Internal Voice-Only Detector, filed Dec. 12, 2000.

* cited by examiner

*Primary Examiner*—Tilahun B Gesesse
(74) *Attorney, Agent, or Firm*—Duke W. Yee; Matthew W. Baca; Theodore D. Fay, III

(57) ABSTRACT

An improved method, apparatus, and computer instructions for a mobile device for managing ring tones. A radio frequency transmission is detected from another mobile device. In response to detecting the radio frequency transmission from the other mobile device, a ring tone used by the other mobile device is identified to form an identified ring tone. The current ring tone is selectively changed for the mobile device to an alternate ring tone, depending on the identified ring tone.

4 Claims, 3 Drawing Sheets

METHOD AND APPARATUS FOR MANAGING RING TONES IN A MOBILE DEVICE

BACKGROUND OF THE INVENTION

1. Technical Field

The present invention related generally to an improved data processing system and in particular to a method and apparatus for processing data. Still more particularly, the present invention relates to a method, apparatus, and computer instructions for managing ring tones in mobile devices.

2. Description of Related Art

Today, mobile phones are common place devices used for communication. Millions of people all over the world use mobile phones to communicate with each other and with people using landline phones. Mobile phones are used everywhere in public and private places. These phones include numerous features in addition to allowing users to make and receive calls. Mobile phones include functions to allow users to store contact information, send and receive text messages, play games, set and track appointments, and generate task lists.

Another feature is an ability to select and change ring tones used to alert a user of an incoming call. Many types of ring tones are available, regular ones and polyphonic ones. Although ring tones are changeable, often times, different phones in the same area will use the same ring tone. For example, several mobile phones in a crowded public area such as a train station, airport, or shopping mall may make it impossible for users to distinguish whether the call is for them or some other user with the same ring tone. A ring tone, as used herein, is an audible alert generated by a mobile device, such as a mobile phone to indicate that a call is present.

Therefore, it would be advantageous to have an improved method, apparatus, and computer instructions for identifying ring tones for mobile devices.

SUMMARY OF THE INVENTION

The present invention provides an improved method, apparatus, and computer instructions for a mobile device for managing ring tones. A radio frequency transmission is detected from another mobile device. In response to detecting the radio frequency transmission from the other mobile device, a ring tone used by the other mobile device is identified to form an identified ring tone. The current ring tone is selectively changed for the mobile device to an alternate ring tone, depending on the identified ring tone.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
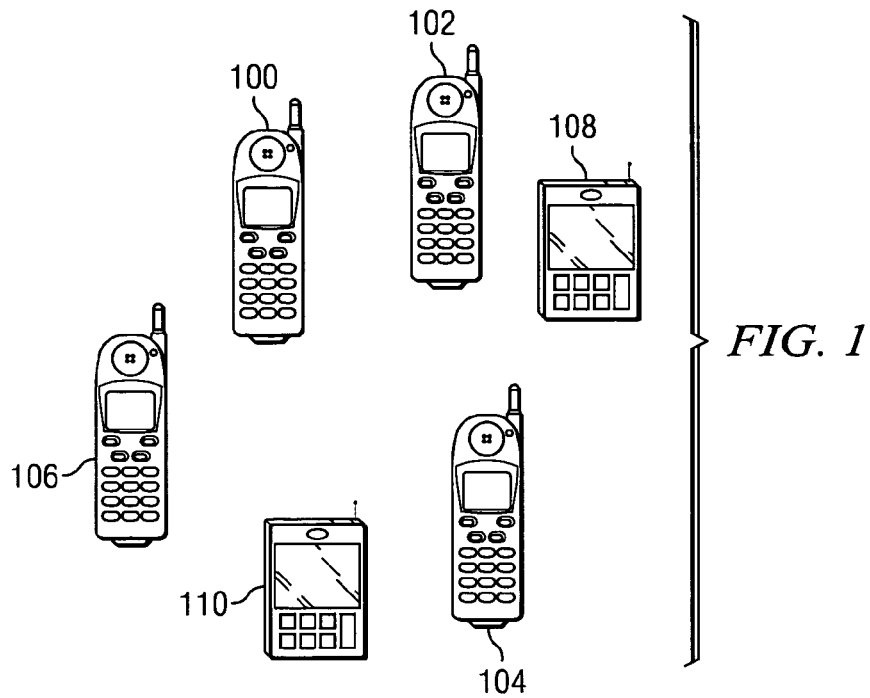
FIG. 1 is a diagram illustrating mobile devices in which the present invention may be implemented.

With reference now to the figures and in particular with reference to FIG. 1, a diagram illustrating mobile devices in which the present invention may be implemented is depicted in accordance with a preferred embodiment. In this example, the mobile devices include mobile phones 100, 102, 104, and 106. The mobile devices in this figure also include personal digital assistant (PDA) 108, and 110. The mechanism of the present invention allows for distinguishing between ring tones set on different mobile devices, especially when the ring tones are set to the same default ring tone.

The mechanism of the present invention allows for a mobile device, such as mobile phone 100 to change its ring tone if it detects another mobile device, such as mobile device 102, nearby. In these examples, another mobile device may be detected through a wireless system, such as BlueTooth. BlueTooth is a short-range radio technology aimed at simplifying communications among devices such as Internet devices and between devices and the Internet. This technology also aims to simplify data synchronization between Internet devices and other computers. When mobile phone 100 detects mobile phone 102, mobile phone 100 broadcasts its ring identifier. In response to receiving the ring identifier, mobile phone 102 transmits its ring identifier, which is received by mobile phone 100. Mobile phone 100 compares its ring identifier with the ring identifier from mobile phone 102. If the ring tones are the same, mobile phone 100 may change its ring tone to an alternate one. This alternate ring tone may be a temporary one and may revert back to the default ring tone in response to some event, such as the expiration of a timer or a user input. The user also is informed of the change to the alternate ring tone. In this particular example, mobile phone 100 is the first to detect the presence of another mobile device.

Depending on the particular implementation, mobile phone 102 may compare its ring identifier with the one broadcast by mobile phone 100. In this case, mobile phone 102 may change its default ring tone to an alternate ring tone if the two devices are using the same ring tones. Further, this detection of mobile devices and changing of ring tones may be applied to multiple devices, which are able to detect each other through a short-range wireless transmission, such as BlueTooth.

With multiple devices, such as mobile phones 100, 102, 104, and 106 and PDAs 108 and 110, the ring tone identification and comparison process described above may be used. With this system, an identification of a ring tone and a comparison is made between each mobile device that detects another mobile device. Alternatively, a priority system may be employed to identify which mobile devices, having the same ring tone, will change to an alternate ring tone.

In each instance in these illustrative examples, the mobile device is BlueTooth enabled, has a capability to choose and assign an alternate ring tone, and is able to broadcast a ring identifier for the current ring tone being used. In this manner, ring tones may be automatically changed to allow users to determine when their mobile device is generating an alert.

Figure 2:
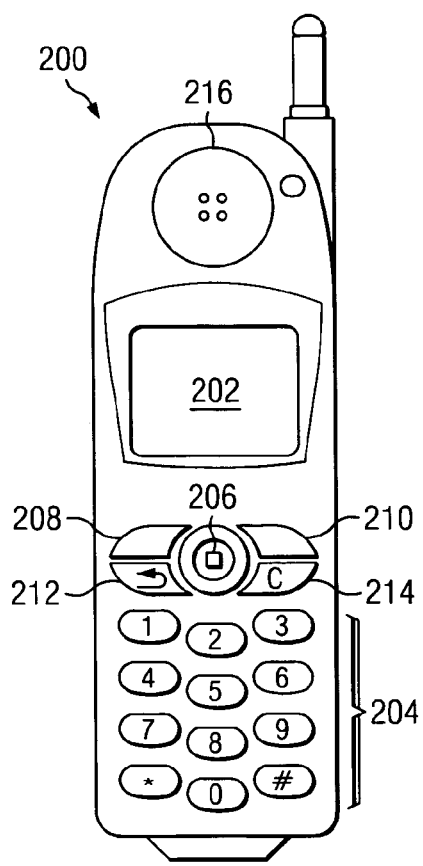
FIG. 2 is a mobile telephone in which the present invention may be implemented.

Turning next to FIG. 2, a mobile telephone is depicted in which the present invention may be implemented. Mobile phone 200 is an example of a mobile phone, such as mobile phone 100 in FIG. 1. Mobile phone 200 includes screen 202, which is capable of displaying pictures and text. Additionally, mobile phone 200 also includes numeric keypad 204, joystick 206, and buttons 208, 210, 212, and 214 placed around the joystick 206. These buttons are used to initiate various functions in mobile phone 200. These functions, include for example, activating a menu, displaying a calendar, or initiating a call. Mobile phone 200 also includes camera 216, which may be used to take pictures or videos depending on the implementation.

Figure 3:
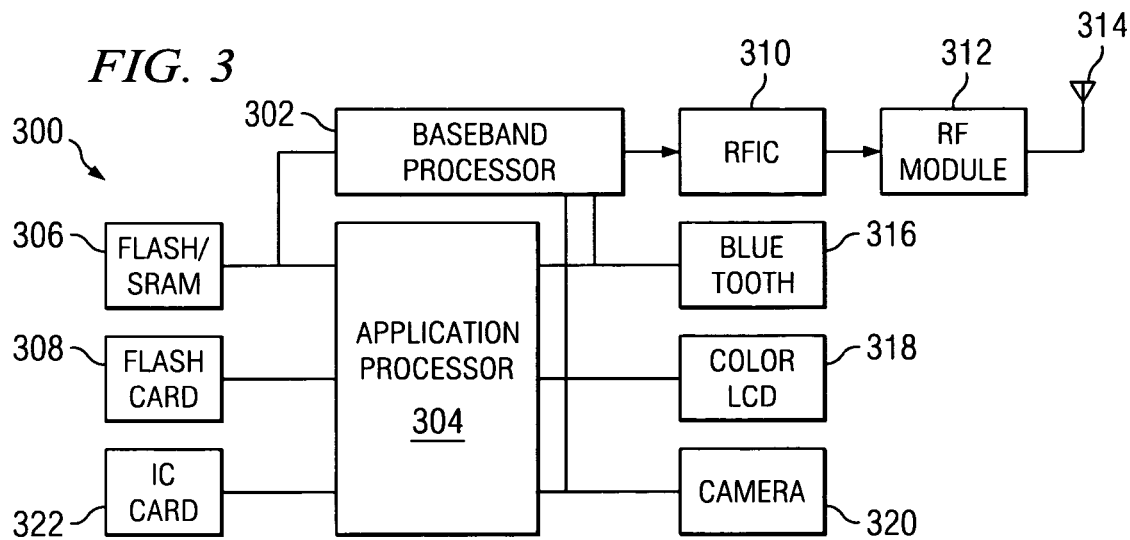
FIG. 3 is a block diagram of a camera phone is depicted in accordance with a preferred embodiment of the present invention.

Turning to FIG. 3, a block diagram of a camera phone is depicted in accordance with a preferred embodiment of the present invention. Camera phone 300 includes baseband processor 302, application processor 304, flash/static random access memory (SRAM) 306, flash card 308, radio frequency integrated circuit (RFIC) 310, radio frequency (RF) module 312, antenna 314, BlueTooth unit 316, color liquid crystal display (LCD) 318, camera 320, and IC card 322.

Baseband processor 302 provides for receiver and transmitter operations and is also referred to as a transceiver. In particular, baseband processor 302 handles all of the audio, signal, and data processing needed to receive and send data using RF transmissions or BlueTooth transmissions. Application processor 304 provides the processing power for other functions within camera phone 300. For example, calculators, calendars, alarms, camera functions, and directories are provided through application processor 304. Flash/SRAM 306 is a storage device in which various instructions for providing the functions within camera phone 300 are located and provide upgrades. Flash card 308 is a storage device in which user data and applications may be stored. An example of flash card 308 is a secure digital card.

A pathway for the transmission of voice and other types of data is through RFIC 310. Additionally, short-range transmissions may be sent or received through BlueTooth unit 316. BlueTooth unit 316 conforms to BlueTooth wireless specification, which defines the link layer and application layer for product developers. Both of these transmissions are made through antenna 314 in this illustrative example.

Color LCD 318 provides a display for pictures and other data for camera phone 300. Camera 320, in this example, is a complementary metal oxide semiconductor (CMOS) camera which may be built into camera phone 300 or connected to camera phone 300 as a module, such as IC card 322. IC card 322 also may contain other application specific functions, such as a global positioning system (GPS) or other functions, such as a modem or additional memory.

Camera 320 forms the camera module of camera phone 300, while the other components form the digital phone module of camera phone 300 in these illustrative examples. Instructions or circuits are added to camera phone 300 to implement the processes of the present invention for managing ring tones. Instructions may be located in flash card 308 or flash/SRAM 306 in these examples. These instructions may be executed by application processor 304. All of the components in camera phone 300 are connected to each other by an interconnect system taking the form of wires, lines or other interconnects.

Figure 4:
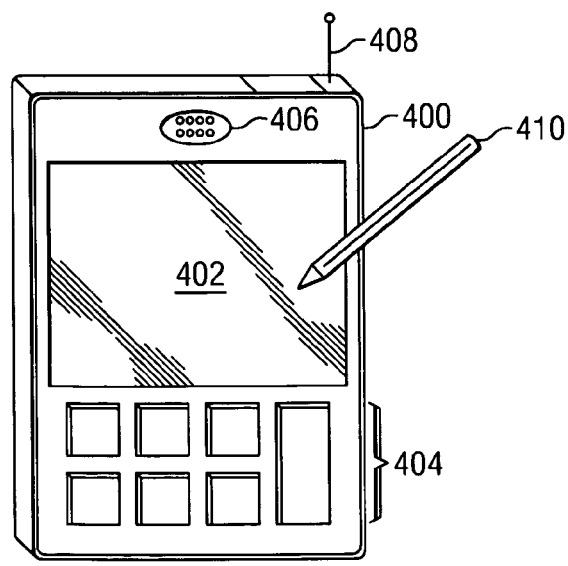
FIG. 4 is a diagram of a client in the form of a PDA in accordance with a preferred embodiment of the present invention.

With reference now to FIG. 4, a diagram of a client in the form of a personal digital assistant (PDA) is depicted in accordance with a preferred embodiment of the present invention. PDA 400 is an example of a PDA, such as PDA 108 in FIG. 1. PDA 400 includes a display 402 for presenting textual and graphical information. Display 402 may be a known display device, such as a liquid crystal display (LCD) device. The display may be used to present a map or directions, calendar information, a telephone directory, or an electronic mail message. In these examples, screen 402 may receive user input using an input device such as, for example, stylus 410.

PDA 400 may also include keypad 404, speaker 406, and antenna 408. Keypad 404 may be used to receive user input in addition to using screen 402. Speaker 406 provides a mechanism for audio output, such as presentation of an audio file. Antenna 408 provides a mechanism used in establishing a wireless communications link between PDA 400 and a network.

PDA 400 also preferably includes a graphical user interface that may be implemented by means of systems software residing in computer readable media in operation within PDA 400.

Figure 5:
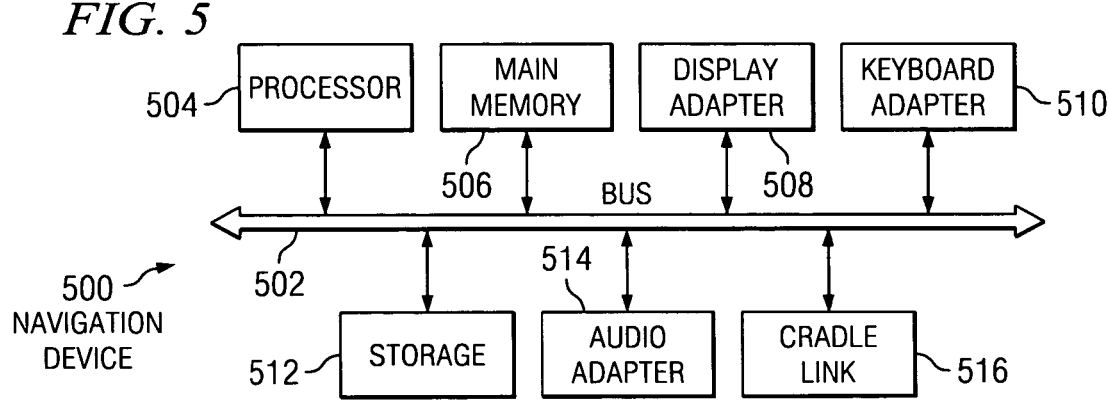
FIG. 5 is a block diagram of a PDA in accordance with a preferred embodiment of the present invention.

Turning now to FIG. 5, a block diagram of a PDA is shown in accordance with a preferred embodiment of the present invention. PDA 500 is an example of a PDA, such as PDA 400 in FIG. 4, in which code or instructions implementing the processes of the present invention may be located. PDA 500 includes a bus 502 to which processor 504 and main memory 506 are connected. Display adapter 508, keypad adapter 510, storage 512, and audio adapter 514 also are connected to bus 502. Bus 502 forms the interconnect system for components in PDA 500. Cradle link 516 provides a mechanism to connect PDA 500 to a cradle used in synchronizing data in PDA 500 with another data processing system. Further, display adapter 508 also includes a mechanism to receive user input from a stylus when a touch screen display is employed.

An operating system runs on processor 504 and is used to coordinate and provide control of various components within PDA 500 in FIG. 5. The operating system may be, for example, a commercially available operating system such as Windows CE, which is available from Microsoft Corporation. Instructions for the operating system and applications or programs are located on storage devices, such as storage 512, and may be loaded into main memory 506 for execution by processor 504.

Those of ordinary skill in the art will appreciate that the hardware in FIG. 5 may vary depending on the implementation. Other internal hardware or peripheral devices, such as flash ROM (or equivalent nonvolatile memory) or optical disk drives and the like, may be used in addition to or in place of the hardware depicted in FIG. 5.

Figure 6:
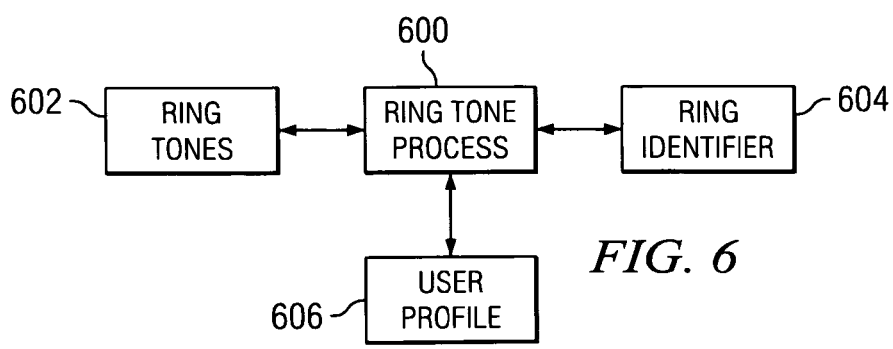
FIG. 6 is a diagram of components used to manage ring tones in accordance with a preferred embodiment of the present invention.

With reference now to FIG. 6, a diagram of components used to manage ring tones is depicted in accordance with a preferred embodiment of the present invention. Ring tone process 600 is a process used to manage ring tones in a manner to allow a user to distinguish the ring tone of the user's mobile device from other mobile devices. Ring tone process 600 may be implemented as a set of instructions or circuits in a mobile device. When ring tone process 600 takes the form of instructions, these instructions may be stored in flash/SRAM 306 for application processor 304 in FIG. 3. These instructions also may be stored in storage 512 for execution by processor 504 in FIG. 5.

In this illustrative example, a default ring tone and an alternate ring tone form ring tones 602. Ring tones 602 also may include additional ring tones. Each of these ring tones may be identified through a ring identifier. The ring identifier may be, for example, a number, an alphanumeric sequence, or a name. In this example, the current ring tone is the default ring tone for the mobile device.

Ring tone process 600 receives ring identifier 604 from another mobile device. In response to receiving this identifier, ring tone process 600 compares ring identifier 604 with the ring identifier for the current ring tone being used in the mobile device. In this example, the current ring tone is the default ring tone set for the mobile device. Ring identifier 604 may be received in response to a broadcast of a ring identifier by ring tone process 600. Alternatively, ring identifier 604 may have been transmitted or broadcast by the other mobile device in response to detecting the mobile device in which ring tone process 600 is located.

If the ring tone identifiers are different, no action is taken to change the current ring tone because the ring tone of the other mobile device will not be confused with the current ring tone of the mobile device in which ring tone process 600 is located. If the ring identifiers are the same, ring tone process 600 selectively changes the current ring tone to an alternate ring tone using user profile 606.

User profile 606 may indicate that the current ring tone should be changed. In this case, the current ring tone remains the same. In another example, user profile 606 may provides an alternate ring tone that is to be used as a current ring tone. In a further illustrative example, user profile 606 may indicate that ring tone process 600 should wait for some period of time and then determine whether a mobile device is detected that has the same ring identifier before changing the current ring tone to an alternate ring tone. Further, user profile 606 may indicate that the user is to be prompted to use an alternate ring tone from ring tones 602. Many other rules and preferences may be set in user profile 606 depending on the particular implementation.

When ring tone process 600 changes the current ring tone, an indication is provided to alert the user to the change in ring tones. This indication may be, for example, a display of a name of the new ring tone. Another indication may be an audible alert to let the user know that the ring tone has changed.

The change in the current ring tone may be temporary. The alternate ring tone used as the current ring tone may revert back to the default ring tone after some period of time. This period of time may be set by the user in user profile 606.

Figure 7:
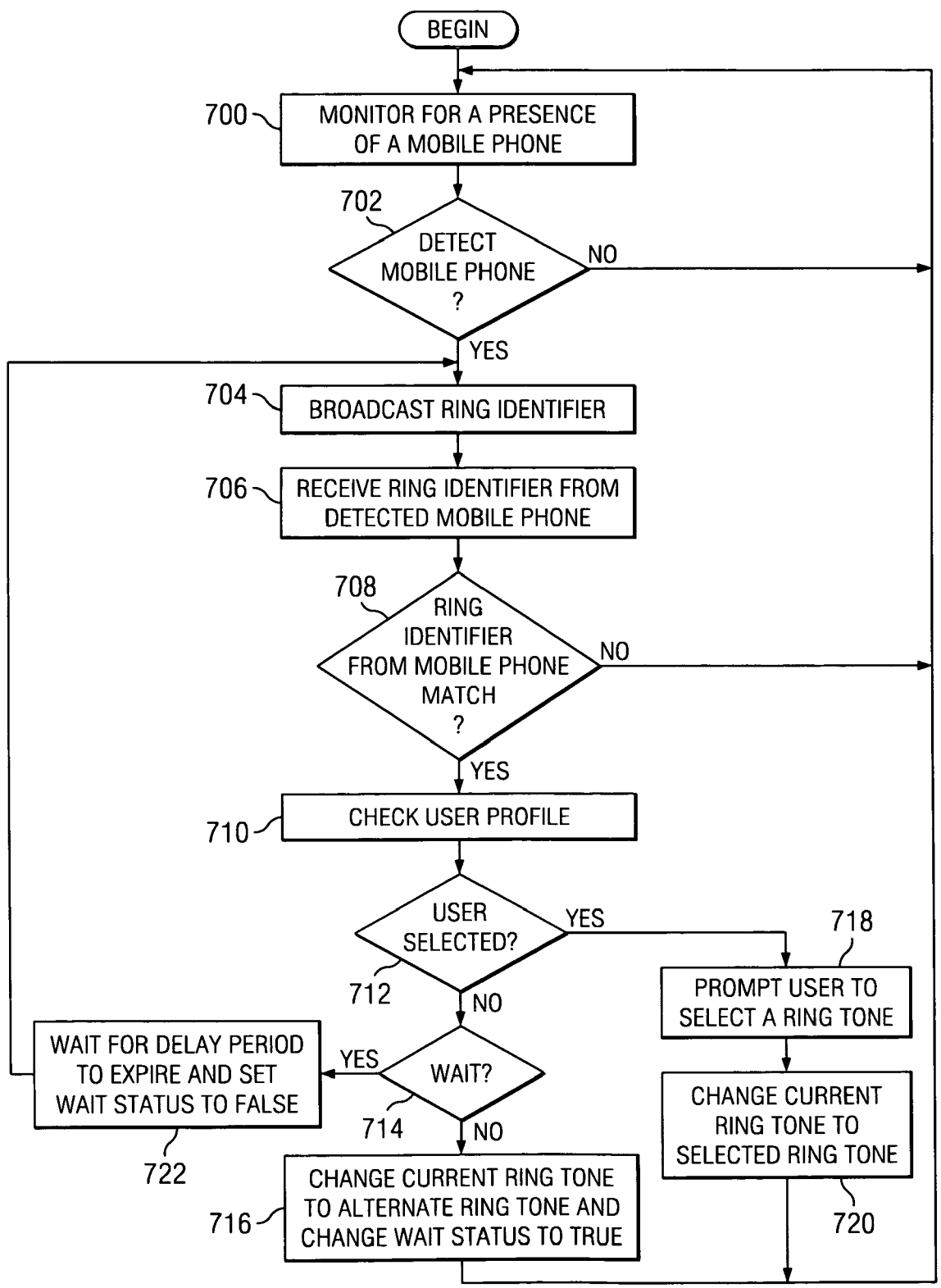
FIG. 7 is a flowchart of a process for changing current ring tones for alternate ring tones in accordance with a preferred embodiment of the present invention.

Turning now to FIG. 7, a flowchart of a process for changing current ring tones for alternate ring tones is depicted in accordance with a preferred embodiment of the present invention. The process illustrated in FIG. 7 may be implemented in a component such as ring tone process 600 in FIG. 6.

The process begins by monitoring for a presence of a mobile phone (step 700). Step 700 in these examples, includes monitoring a radio frequency, such as the frequencies used by BlueTooth, for a mobile phone. A determination is made as to whether a mobile phone is detected (step 702). If a mobile phone is present, a ring identifier is broadcast (step 704). The ring identifier is for the current or default ring tone being used in the device. A ring identifier from the detected mobile phone is received (step 706). This ring identifier in step 706 is received in response to the broadcast made in step 704.

Next, a determination is made as to whether the ring identifier from the mobile phone matches the ring identifier for the current ring tone (step 708). If a match between the ring identifiers is present, the user profile is checked (step 710). The user profile is used to identify which steps are to be taken in response to a match in the ring identifiers.

In this illustrative example, a determination is made as to whether the ring tone to be used as the alternate ring tone is to be user selected (step 712). If the alternate ring tone is not to be user selected, a determination is made as to whether to wait for some period of time (step 714). This period of time also is referred to as a delay period. This determination is made in these examples, by checking a wait status. A true wait status indicates that the process should wait for the period of time, while a false wait status indicates that the process should not wait for the period of time. If the process is not to wait for a period of time, the current ring tone is changed to an alternate ring tone and changes the wait status to true (step 716) with the process then returning to step 700 as described above.

Turning back to step 712, if the ring tone is to be user selected, the user is prompted to select a ring tone (step 718). The current ring tone is changed to the selected ring tone (step 720) with the process then proceeding to step 700 as described above.

With reference again to step 714, if a determination is made to wait for a period of time, the process waits for the delayed period to expire and sets a wait status to false (step 722). After the delay period expires, the process returns to step 704 as previously described. Additionally, in this example the wait status is a flag or some indicator is set after the process waits for the delay period to expire. As a result, the next time step 714 is encountered, the process will not wait for a delay period in this illustrative example.

Turning back to step 702, if a mobile phone is not present, the process returns to step 700 to monitor for the presence of a mobile phone. Turning to step 708 if a match in ring identifiers is not present, the process also returns to step 700. Although the steps in FIG. 7 are directed towards managing ring tones in mobile phones, this process may be applied to other types of mobile devices, such as PDAs. Additionally, the process illustrated in FIG. 7 depicts one particular method in which ring tones may be changed. Other steps may be added in addition to or in place of these illustrated steps. For example, additional steps may be included to return the ring tone of the mobile phone to the default ring tone after a period of time has past or when another mobile phone is no longer detected in the broadcast and receive steps described for steps 704 and 706.

Thus, the present invention provides a method, apparatus and computer instructions for managing ring tones in a manner to allow a user to distinguish the ring of the user's mobile device from other ring tones of other mobile devices in the area. When two mobile devices have the same ring tones, one mobile device may change its ring tone to an alternate ring tone using the mechanism of the present invention. This process also may be used to change ring tones for three or more devices.

In these examples, a short-range radio frequency transmission system is used to detect other mobile devices and transmit other information, such as ring identifiers. The presence of another mobile device may be identified using other mechanisms. For example, GPS information may be sent a server. The server may identify mobile units that are within a selected range from each other and initiate the process illustrated in FIG. 7.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a mobile device for managing ring tones, the method comprising:
    detecting a radio frequency transmission on a first mobile device from a second mobile device;
    responsive to detecting the radio frequency transmission from the second mobile device, transmitting a current ring identifier for a current ring tone of the first mobile device to the second mobile device and receiving a ring identifier transmitted from the second mobile device;
    identifying a ring tone used by the second mobile device to form an identified ring tone;
    responsive to the identified ring tone, comparing the ring identifier of the second mobile device with the current ring identifier for the current ring tone of the first mobile device to determine whether the current ring tone is a same ring tone as the ring tone used by the second mobile device; and
    responsive to the current ring tone of the first mobile device being the same ring tone as the ring tone used by the second mobile device, selectively changing the current ring tone for the first mobile device to an alternate ring tone.

2. The method of claim 1, wherein the selectively changing step includes:
    selectively changing the current ring tone of the first mobile device to an alternate ring tone based on a user profile.

3. The method of claim 1, wherein the selectively changing step includes:
    prompting for a user input to select a new ring tone for the first mobile device.

4. The method of claim 3, wherein the new ring tone is selected from one of the current ring tone and a different ring tone from the current ring tone.

* * * * *